United States Patent [19]

Pamlin

[11] 4,005,955
[45] Feb. 1, 1977

[54] ROTARY INTERNAL COMBUSTION ENGINE WITH LIQUID COOLED PISTON

[75] Inventor: Roland Pamlin, Handen, Sweden

[73] Assignee: Svenska Rotor Maskiner Aktiebolag, Nacka, Sweden

[22] Filed: Oct. 28, 1975

[21] Appl. No.: 625,909

[30] Foreign Application Priority Data

Oct. 29, 1974 United Kingdom .............. 46838/74

[52] U.S. Cl. ................................................ 418/94
[51] Int. Cl.² ........................................ F01C 21/06
[58] Field of Search ................................ 418/91, 94

[56] References Cited

UNITED STATES PATENTS

| 1,098,440 | 6/1914 | Hicks, Jr. et al. | 418/94 |
| 3,472,210 | 10/1969 | Savoie, Jr. | 418/94 |
| 3,531,227 | 9/1970 | Weatherston | 418/94 |

FOREIGN PATENTS OR APPLICATIONS

| 524,897 | 9/1921 | France | 418/94 |

*Primary Examiner*—C. J. Husar
*Assistant Examiner*—Leonard Smith
*Attorney, Agent, or Firm*—Flynn & Frishauf

[57] ABSTRACT

A rotary internal combustion engine comprising two intermeshing rotors provided with radially extending lobes and intervening grooves, the lobes of at least one of the rotors being provided with radially extending channels for supply and return of cooling liquid from and to, respectively, axially extending central channels of the rotor, said return channels being interposed between said supply channels and a heated surface portion of the lobes. The temperature difference between the cooling liquid portions in the radially extending channels being utilized for circulating the liquid under the action of the centrifugal forces arising during rotation of the rotors.

8 Claims, 3 Drawing Figures

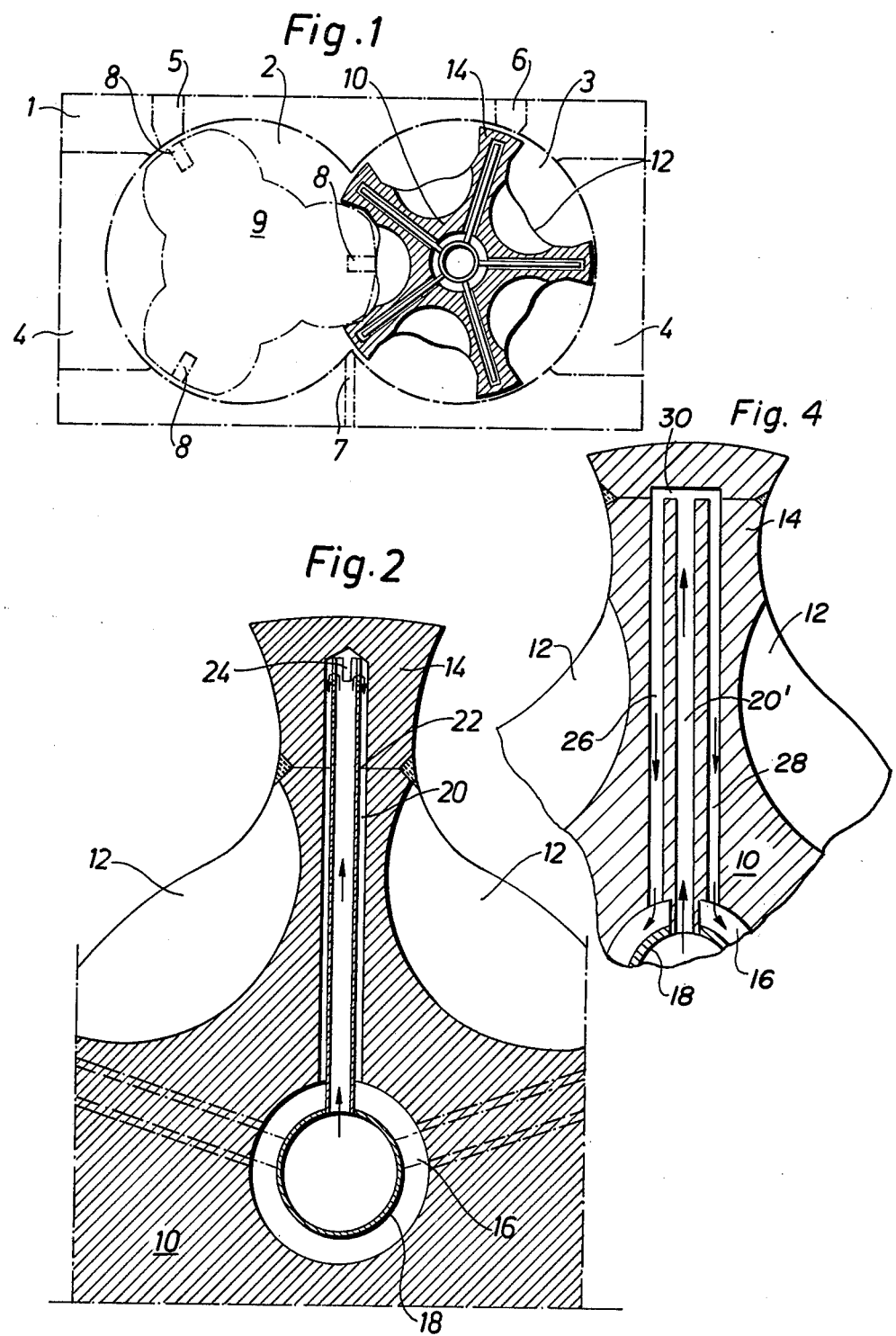

ROTARY INTERNAL COMBUSTION ENGINE WITH LIQUID COOLED PISTON

The present invention relates to a rotary positive displacement internal combustion engine of the type comprising two intermeshing rotors, each provided with a central hub portion, a number of axially and radially extending spokelike lobes with intervening grooves, and within its hub portion a central channel system comprising a supply channel and a discharge channel for passage of a cooling liquid therethrough.

More specifically the invention relates to means of such an engine providing an automatic circulation of the cooling liquid in radial direction for transfer of the heat to be removed radially inwardly to the central channel system owing to the centrifugal forces acting upon two media of different density.

In rotors of complicated shape, especially such provided with several relatively thin spokes extending from a central hub it is a problem to circulate the cooling liquid passing through the hub out into and back from the spokes in order to obtain an efficient cooling of the spokes. One example of such a rotor is a rotor of an internal combustion engine of the type comprising two intermeshing rotors each provided with grooves and intervening lands extending radially inwardly from a generally cylindrical surface. An engine of such a type is for instance shown in British Pat. No. 1,172,828. In such a machine the lands of the rotors represent the spokes mentioned above.

Up to now it has been necessary to shape the rotors with a complicated system of cooling channels to be passed through by means of a forced pump circulation. Anyhow there are difficulties to avoid pockets of stagnant liquid resulting in inadequate cooling of certain portions of the rotor lands.

The aim of the present invention is to achieve means for the internal cooling of such rotors which means are efficient, simple and inexpensive in production. The invention is characterized in that at least one of the rotors within each of its spokelike lobes is provided with at least one radially extending channel having an inner end communicating with said central supply channel and an outer end communicating with a radially extending return passage connected to said central discharge channel, said radially extending return passage being interposed said radially extending channel and a heated surface portion of said lobe to be cooled. Since each return passage is interposed a radially extending channel and a flank of the land so that the heat transferred from the flank to the cooling liquid is supplied to the liquid in the interposed passage only the liquid in the interposed passage will get a higher temperature than that in the radially extending channel and consequently the density of the liquid will be somewhat different in the two channels. The centrifugal forces acting upon the liquid during revolving of the rotor will then be different in the two channels resulting in an automatic circulation of the cooling liquid from the central channel system outwardly through said set of radially extending channels and inwardly back to the central channel system through said set of interposed passages. Furthermore the higher the temperature of the flank the larger the difference in density between the liquid in the two channels and consequently the speed of the radial circulation is increased which means that the capacity of the cooling automatically increases with an increased supply of heat so that the temperature of the flank will be practically the same independent of the amount of heat supplied to the surface of the rotor.

BRIEF DESCRIPTION OF THE DRAWINGS

FIG. 1 shows a cross section of a rotary abutment member for a rotary internal combustion engine of the type schematically indicated by dot-dash lines, FIG. 2 shows a detail of FIG. 1 on a larger scale, FIG. 4 shows a detail of a modified embodiment.

DETAILED DESCRIPTION OF ILLUSTRATED EMBODIMENTS

Figure 3:
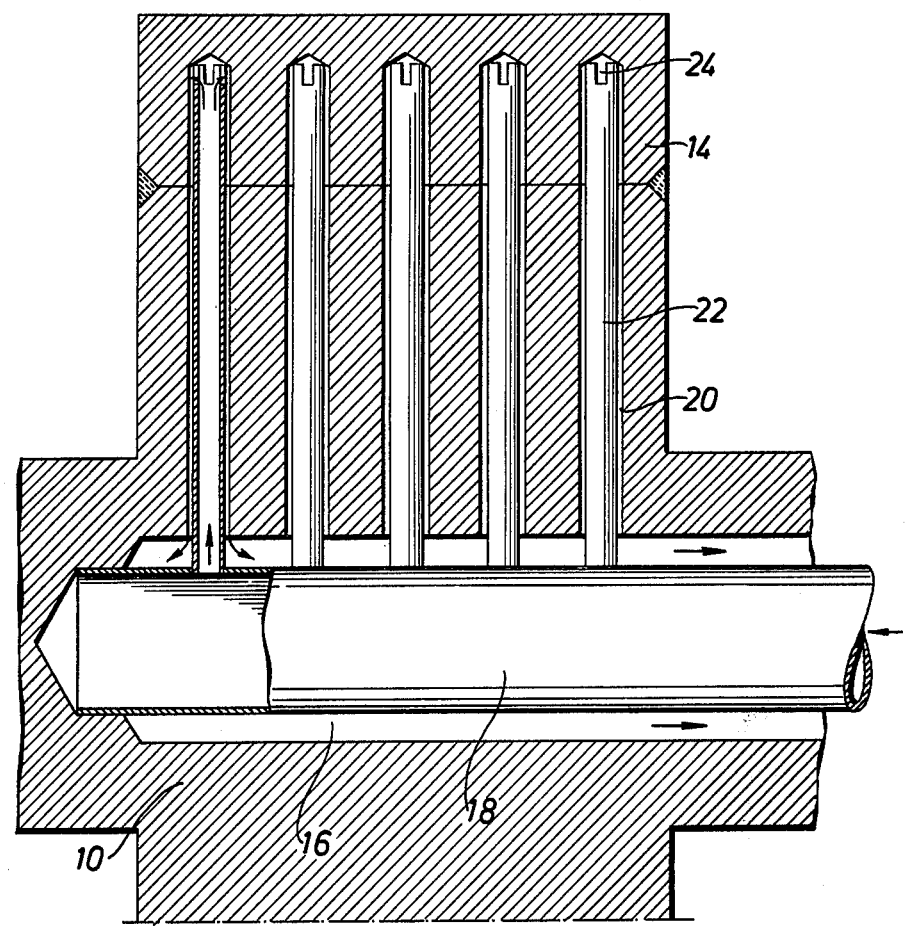
FIG. 3 shows a longitudinal section of the rotor detail shown in FIG. 2.

The engine indicated by dot-dash lines in FIG. 1 has a casing 1 enclosing a working space composed of the barrel walls of two intersecting bores 2, 3 having parallel axes and intersecting along two straight axial lines and two end walls. The casing 1 is provided with combined inlet and scavenging outlet channels 4 and with exhaust ports 5, 6 in the barrel walls of the two intersecting bores 2, 3 and further with a fuel injection nozzle 7 and a spark plug 8 placed in a somewhat depressed position in each of the three tip portions of a power rotor 9 which is rotatably mounted in the casing 1 for sealing cooperation with the walls of the bore 2.

A rotary abutment member or abutment rotor 10 is rotatably mounted in the casing 1 for sealing cooperation with the walls of the bore 3 and with the power rotor 9 as is clearly described in British patent specification 1,392,174 corresponding to U.S. Pat. No. 3,777,723. The abutment rotor 10 is provided with five grooves 12 and intervening lands 14 extending axially along the rotor. As better shown in FIGS. 2 and 3 the rotor 10 is provided with a central, axially extending bore 16 in which a concentric pipe 18 is inserted. A cooling liquid is in a conventional manner supplied to the pipe 18 and discharged from the bore 16 outside the pipe 18. Each land 14 of the rotor 10 is further provided with five axially spaced bores 20 extending radially outwards from the central bore 16. A pipe 22 is inserted in each radial bore 20 and is supported at its outer end by the bottom of the bore 20, whereas its inner end penetrates the central pipe 18 and is supported thereby. The outer end of the pipe 22 is further provided with slits 24 in order to form a communication between the pipe 22 and the surrounding bore 20.

The internal cooling of the rotor 10 takes place in the following way. The cooling liquid, for instance water or oil, is supplied to the central pipe 18 from an outer source, not shown, of cooling liquid and fills up the channel system, comprising the central pipe 18, the radial pipes 22, the radial bores 20, and the central bore 16, and is discharged from the central bore 16 through a cooler, not shown, and fed back to the liquid source. During operation of the engine the rotor 10 is continuously revolved at a high speed, simultaneously as the flanks and the crest of each rotor land 14 is exposed to the high temperature of the working fluid passing through the engine. Owing to the centrifugal forces the cooling liquid will be forced outwardly through the radial pipes 22 and the radial bores 20. The heat absorbed by the surfaces of the rotor land 14 from the hot working fluid is transferred through the body of the land 14 to the surface of each radial bore 20, and further transferred to the liquid in the bore 20 contacting said surface. The liquid in the bore 20 outside the pipe 22 will in this way get a higher temperature than that of the liquid inside the pipe 22. Owing to the temperature difference the density of the liquid outside the pipe 22 will be lower than that inside the pipe 22. Consequently the centrifugal forces acting upon the liquid outside and inside the bore 22 will not any longer be the same, but the forces acting upon the liquid outside the pipe 22 will decrease relative to the forces acting upon the liquid inside the pipe 22, resulting in a forced circulation outwardly inside the pipe 22 and inwardly outside the pipe 22. In other words an automatic circulation of the cooling liquid through the radial channel system is achieved.

This automatic circulation effect can be taken care of in different ways.

The simplest way is to completely rely upon this effect which means that no pump is needed for the circulation of the liquid from and back to the liquid source.

However, in most cases a pump for the circulation is needed to speed up the flow in spite of the flow losses in the system including the liquid cooler, which otherwise must be considerably larger. In such a pump circulation system the automatic circulation effect is of extreme importance not only to the resulting decrease of the power needed for the pump, but primarily as it guarantees such a distribution of the liquid that more liquid is distributed to those portions of the rotor 14 where the temperature is higher than to those portions thereof where the temperature is lower. The cooling effect is thus so distributed inside the rotor that not only the different lands 14 will be kept at about the same temperature, but also the different axial sections of each land 14 will be kept at practically the same temperature. In other words the invention results in a guarantee that no portion is overheated without any risk that any other part thereof is cooled down to a non-desired low temperature resulting in a disadvantageous increase of the cooling losses of the engine.

When using a pump circulation system a direct communication between the central pipe 18 and the surrounding bore 16 may be advantageous for reduction of the cooling effect at part load of the engine, and if the cooling liquid passes axially through the rotor 10 from an inlet in one end thereof to an outlet in the other end thereof the central pipe 18 may be completely dispensed with.

One or both rotors 9, 10 may be provided with means for cooling the rotors.

If the interspaces between the bore 20 and the adjacent surfaces of the land 14 in FIG. 2 is not too narrow, it is possible, as shown in FIG. 4 to use the bore 20' as a substitute for said radially extending channel 22 and to provide each land 14 with radially extending return bores 26, 28 on opposite sides of each bore 20' adjacent the surfaces of the lands 14, the outer ends of each bore 20' and its adjacent return bores 26, 28 being connected to each other via suitable circumferential passages 30.

I claim:

1. In a rotary positive displacement internal combustion engine of the type comprising:
    two intermeshing rotors, each provided with a central hub portion and a number of axially and radially extending spoke-like lobes with intervening grooves;
    at least one of the rotors within its hub portion being provided with a central channel system comprising an axially extending supply channel and an axially extending discharge channel, and within each lobe at least one radially extending supply channel communicating with said axial supply channel and at least one radial return passage communicating with said radial supply channel and said axial discharge channel for passage of a cooling liquid therethrough to cool the respective rotor;
    the improvement wherein:
    said radially extending supply channel and return passage of each lobe comprise a substantially radial bore in said lobe and a supply pipe, said pipe being radially inserted in the bore and in communication with said axial supply channel, the interior of said supply pipe comprising the radially extending supply channel, said radially extending return passage being a space surrounding at least a portion of said supply pipe and being in communication with the interior of said supply pipe and with said axial discharge channel.

2. A rotary engine as defined in claim 1, wherein each lobe is provided with a plurality of axially spaced radially extending supply channels and associated radially extending return passages.

3. A rotary engine as defined in claim 1, wherein said pipe and bore are substantially round in cross-section, and said radially extending return passage is an annular space surrounding said pipe.

4. A rotary engine as defined in claim 1, wherein said space surrounding at least a portion of said supply pipe is in communication with the outermost portion of said supply pipe in the radial direction of said rotor.

5. A rotary engine as defined in claim 1, wherein said pipe has a slit therein at the outermost portion thereof in the radial direction of said rotor to improve communication with the outer end of said at least one radially extending return passage.

6. A rotary engine as defined in claim 5, wherein each lobe is provided with a plurality of axially spaced radially extending supply channels and associated radially extending return passages.

7. A rotary engine as defined in claim 1, wherein said axially extending supply and discharge channels of said at least one rotor comprise an axial bore in said hub portion and an axially extending central pipe in said axial bore, said axially extending central pipe being provided with radial apertures through which the interior of said axially extending central pipe communicates with the interior of said radially extending supply pipes, the inner ends of said radially extending supply pipes being attached to the central pipe.

8. A rotary engine as defined in claim 7, wherein each lobe is provided with a plurality of axially spaced radially extending supply channels and associated radially extending return passages.

* * * * *